US012132890B2

(12) United States Patent
Furht et al.

(10) Patent No.: US 12,132,890 B2
(45) Date of Patent: *Oct. 29, 2024

(54) ENCODER FOR INTERPREDICTION IN GEOMETRIC PARTITIONING WITH AN ADAPTIVE NUMBER OF REGIONS

(71) Applicant: OP Solutions LLC, Amherst, MA (US)

(72) Inventors: Borivoje Furht, Boca Raton, FL (US); Hari Kalva, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,058

(22) Filed: Jun. 2, 2023

(65) Prior Publication Data
US 2023/0308640 A1    Sep. 28, 2023

Related U.S. Application Data

(63) Continuation of application No. 17/676,996, filed on Feb. 22, 2022, now Pat. No. 11,695,922, which is a
(Continued)

(51) Int. Cl.
*H04N 19/136*    (2014.01)
*H04N 19/105*    (2014.01)
(Continued)

(52) U.S. Cl.
CPC ......... *H04N 19/105* (2014.11); *H04N 19/124* (2014.11); *H04N 19/13* (2014.11);
(Continued)

(58) Field of Classification Search
CPC ...... H04N 19/52; H04N 19/96; H04N 19/119; H04N 19/176
See application file for complete search history.

(56) References Cited

U.S. PATENT DOCUMENTS 10,798,375 B2 *  10/2020  Piao ............... H04N 19/137
11,122,266 B2 *  9/2021   Zhang ............. H04N 19/58
(Continued)

*Primary Examiner* — Tsion B Owens
(74) *Attorney, Agent, or Firm* — OP Solutions IP Department; Paul Ackerman

(57) ABSTRACT

An encoder configured to generate an encoded bitstream for decoding by a compatible decoder, wherein the decoder receives the encoded bitstream with a current picture including a current block having a first partition boundary partitioning the block into first and second non-rectangular regions and a second partition boundary, intersecting the first partition boundary, and partitioning the second non-rectangular region into three portions. Using the encoded bitstream, the decoder determines a first predictor for use within the first non-rectangular region using a first motion vector selected from a first list of motion vector candidates, determines a second predictor for use within the second non-rectangular region using a second motion vector selected from a second list of motion vector candidates; and decodes the current block using the first predictor and the second predictor. Decoding further includes smoothing the first predictor and the second predictor across the first partition boundary.

6 Claims, 12 Drawing Sheets

Related U.S. Application Data continuation of application No. 17/006,508, filed on Aug. 28, 2020, now Pat. No. 11,259,014, which is a continuation of application No. PCT/US2020/015410, filed on Jan. 28, 2020.

(60) Provisional application No. 62/797,820, filed on Jan. 28, 2019.

(51) Int. Cl.
| | |
|---|---|
| *H04N 19/124* | (2014.01) |
| *H04N 19/13* | (2014.01) |
| *H04N 19/176* | (2014.01) |
| *H04N 19/44* | (2014.01) |
| *H04N 19/513* | (2014.01) |
| *H04N 19/593* | (2014.01) |

(52) U.S. Cl.
CPC ......... *H04N 19/136* (2014.11); *H04N 19/176* (2014.11); *H04N 19/44* (2014.11); *H04N 19/513* (2014.11); *H04N 19/593* (2014.11)

(56) References Cited

U.S. PATENT DOCUMENTS

2020/0137408 A1*  4/2020  Laroche ................ H04N 19/43
2021/0243461 A1*  8/2021  Park .................... H04N 19/105

* cited by examiner

ENCODER FOR INTERPREDICTION IN GEOMETRIC PARTITIONING WITH AN ADAPTIVE NUMBER OF REGIONS

CROSS-REFERENCE TO RELATED APPLICATIONS

This application is a continuation of co-pending application Ser. No. 17/676,996, filed on Feb. 22, 2022, titled "INTER PREDICTION IN GEOMETRIC PARTITIONING WITH AN ADAPTIVE NUMBER OF REGIONS," which is a continuation of application Ser. No. 17/006,508, filed on Aug. 28, 2020 titled "INTER PREDICTION IN GEOMETRIC PARTITIONING WITH AN ADAPTIVE NUMBER OF REGIONS" and claims the benefit of International Application Serial No. PCT/US20/15410, filed on Jan. 28, 2020 and titled "INTER PREDICTION IN GEOMETRIC PARTITIONING WITH AN ADAPTIVE NUMBER OF REGIONS," which claims the benefit of priority of U.S. Provisional Patent Application Ser. No. 62/797,820, filed on Jan. 28, 2019, and titled "INTER PREDICTION IN GEOMETRIC PARTITIONING WITH AN ADAPTIVE NUMBER OF REGIONS," each of which is hereby incorporated by reference herein in their entirety.

FIELD OF THE INVENTION

The present invention generally relates to the field of video compression. In particular, the present invention is directed to inter prediction in geometric partitioning with an adaptive number of regions.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

SUMMARY OF THE DISCLOSURE

In an aspect a decoder includes circuitry configured to receive a bitstream, partition a current block via a geometric partitioning mode into three portions, determine a motion vector associated with a portion of the three portions, wherein determining further includes constructing a candidate list, and decode the current block using the determined motion vector.

In another aspect, an encoder includes circuitry configured to encode a bitstream for decoding by a compatible decoder, in which the decoder is configured to receive the encoded bitstream including a current picture, the current picture further including a current block having at least a first partition boundary partitioning the block into first and second non-rectangular regions. The current block further including a second partition boundary, intersecting the at least first partition boundary, and partitioning the second non-rectangular region to partition the current block into three portions. From the encoded bitstream, the decoder determines a first predictor for use within the first non-rectangular region using a first motion vector selected from a first list of motion vector candidates and determines a second predictor for use within the second non-rectangular region using a second motion vector selected from a second list of motion vector candidates. The decoder decodes the current block using the first predictor and the second predictor. Decoding the encoded bitstream further includes smoothing the first predictor and the second predictor across the at least first partition boundary.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
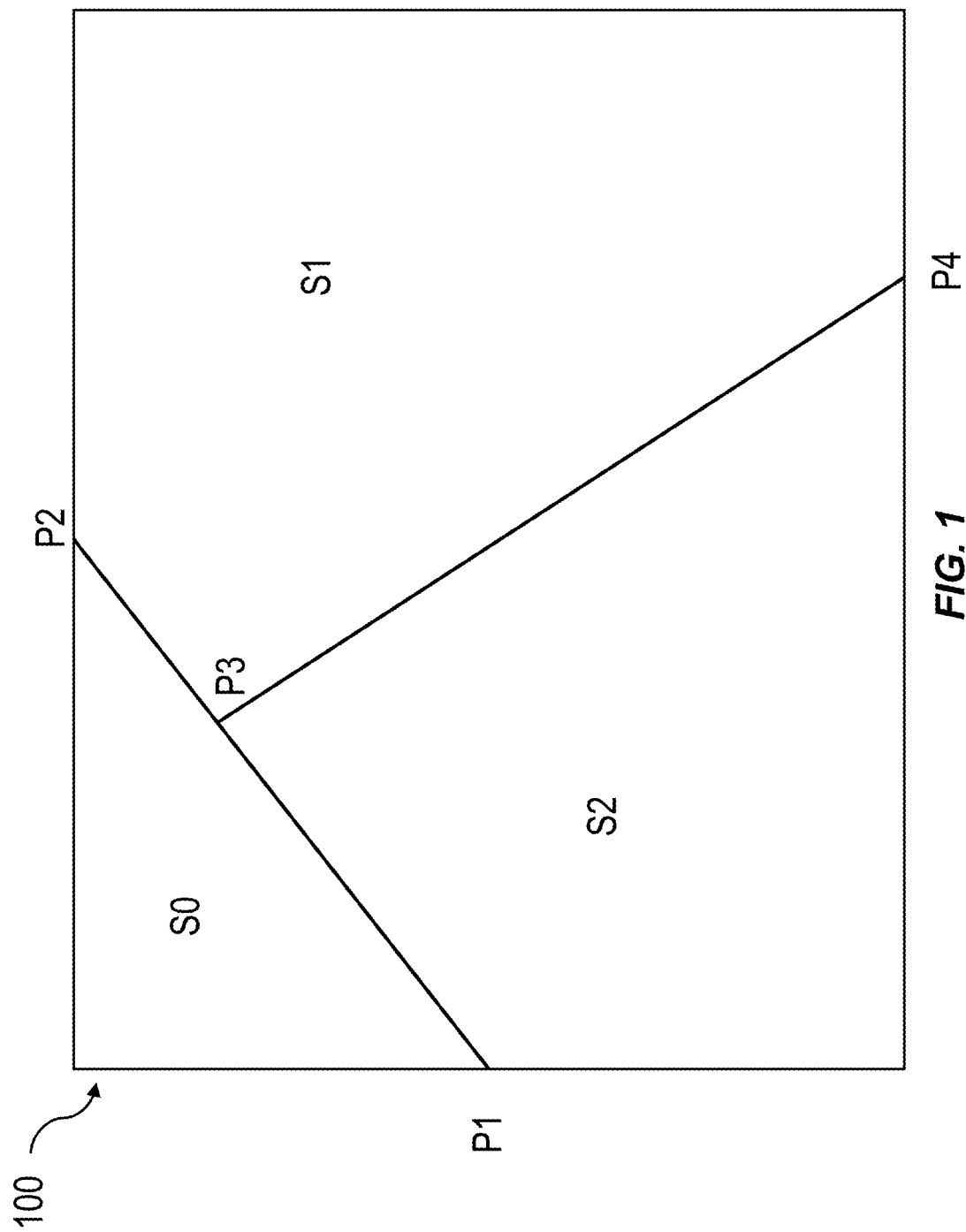
FIG. 1 is an illustration showing an example of a residual block (e.g., current block) with geometric partitioning where there are three regions.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Some implementations of the current subject matter include performing inter prediction with regions that have been partitioned with a geometric partitioning mode with an adaptive number of regions in which a rectangular block may be divided into three or more non-rectangular regions. Performing inter prediction with non-rectangular blocks that have been partitioned with geometric partitioning with an adaptive number of regions may allow partitioning to more closely follow object boundaries, resulting in lower motion compensation prediction error, smaller residuals, and thus improved compression efficiency. During inter prediction, motion compensation may be performed using motion vectors predicted for blocks (e.g., coding units, prediction units, and the like) determined according to a geometric partitioning mode. Motion vectors may be predicted using advanced motion vector prediction (AMVP) and/or via merge mode, where the motion vector is selected from a list of motion vector candidates without encoding a motion vector difference.

The current subject matter may be applied to relatively larger blocks, such as blocks with a size of 128×128 or 64×64, for example. In some implementations, the geometric partitioning may involve partitioning a current block into an adaptive number of regions, such as three or more regions for a given current block, and a motion information can be determined for each region.

Motion compensation may include an approach to predict a video frame or a portion thereof given the previous and/or future frames by accounting for motion of the camera and/or objects in the video. It may be employed in the encoding and decoding of video data for video compression, for example in the encoding and decoding using the Motion Picture Experts Group (MPEG)-2 (also referred to as advanced video coding (AVC)) standard. Motion compensation may describe a picture in terms of the transformation of a reference picture to the current picture. The reference picture may be previous in time or from the future when compared to the current picture. When images can be accurately synthesized from previously transmitted and/or stored images, the compression efficiency may be improved.

Block partitioning may refer to a method in video coding to find regions of similar motion. Some form of block partitioning may be found in video codec standards including MPEG-2, H.264 (also referred to as AVC or MPEG-4 Part 10), and H.265 (also referred to as High Efficiency Video Coding (HEVC)). In example block partitioning approaches, non-overlapping blocks of a video frame may be partitioned into rectangular sub-blocks to find block partitions that contain pixels with similar motion. This approach can work well when all pixels of a block partition have similar motion. Motion of pixels in a block may be determined relative to previously coded frames.

Motion vector prediction may be effectively implemented in geometric partitioning with adaptive number of regions. In more detail, geometric partitioning with an adaptive number of regions may include techniques for video encoding and decoding in which a rectangular block is further divided into two or more regions that may be non-rectangular. For example, FIG. 1 is an illustration showing an example of a residual block (e.g., current block) 100 with geometric partitioning where there are three segments, S0, S1, and S2. Current block 100 may have a width of M pixels and a height of N pixels, denoted as M×N pixels, such as 64×64 or 128×128. Current block may be geometrically partitioned according to two line segments (P1P2 and P3P4), which may divide the current block into the three regions S0, S1, and S2. When pixels in S0 have similar motion, a motion vector may describe the motion of all pixels in that region. As described more fully below, the respective motion vectors may be determined according to an AMVP mode or a merge mode. Motion vector may be used to compress region S0. Similarly, when pixels in region S1 have similar motion, an associated motion vector may describe the motion of pixels in region S1. Similarly, when pixels in region S2 have similar motion, an associated motion vector may describe the motion of pixels in region S2. Such a geometric partition may be signaled to a receiver (e.g., decoder) by encoding positions P1, P2, P3, P4 (or representations of these positions, such as, using polar coordinates, indices into predefined templates, or other characterizations of the partitions) in a video bitstream.

With continued reference to FIG. 1, when encoding video data utilizing geometric partitioning at the pixel level, line segment P1P2 (or more specifically points P1 and P2) may be determined. In order to determine a line segment P1P2 (or more specifically points P1 and P2) that best divides a block when utilizing geometric partitioning at the pixel level, possible combinations of points P1 and P2 depends on M and N, which are the block width and height. For a block of size M×N, there are (M−1)×(N−1)×3 possible partitions. Identifying a correct partition thus may become a computationally expensive task of evaluating motion estimation for all possible partitions, which may increase an amount of time and/or processing power required to encode a video as compared to encoding using rectangular partitioning (e.g., without geometric partitioning at the pixel level). What constitutes the best or right partition may be determined according to a metric and may change from implementation to implementation.

In some implementations, and still referring to FIG. 1, partitioning occurs iteratively in that a first partition may be determined (e.g., determine line P1P2 and associated regions) forming two regions, and then one of those regions may be further partitioned. For example, a partitioning described with reference to FIG. 1 may be performed to partition a block into two regions. One of those regions may be further partitioned (e.g., to form new region S1 and region S2). A process may continue to perform block level geometric partitioning until a stopping criteria is reached.

Continuing to refer to FIG. 1, inter prediction may be performed using regions that have been geometrically partitioned. Motion vectors for motion compensation may be derived using AMVP or merge mode. In AMVP, a motion vector prediction is made by signaling an index into a motion vector candidate list and the motion vector difference (e.g., residual) is encoded and included in the bitstream. In merge mode, a motion vector is selected from a list of motion vector candidates without encoding a motion vector difference thereby enabling a current block to adopt motion information of another previously decoded block. In both AMVP and merge mode, a candidate list may be constructed by both an encoder and a decoder, and an index into the candidate list is signaled in a bitstream.

Still referring to FIG. 1, partitioning may include partitioning into two or more portions, including without limitation three portions. Three portions may include three region and/or subregions of current block. For instance, a decoder, encoder or other device may partition a current block, such as without limitation a coding tree unit (CTU), into three portions by partitioning the current block into a first region and a second region and partitioning the second region into two sub-regions.

Continuing to refer to FIG. 1, a decoder, encoder, or other device, component, and/or module may determine that a merge mode is enabled for a first portion of the three portions; decoder, encoder, or other device, component, and/or module may the first portion according to the merge mode. As a further non-limiting example, decoder, encoder, or other device, component, and/or module may determine that a merge mode is disabled for a first portion of the three portions; decoder, encoder, or other device, component, and/or module may decode the first portion as a function of a motion vector difference.

Figure 2:
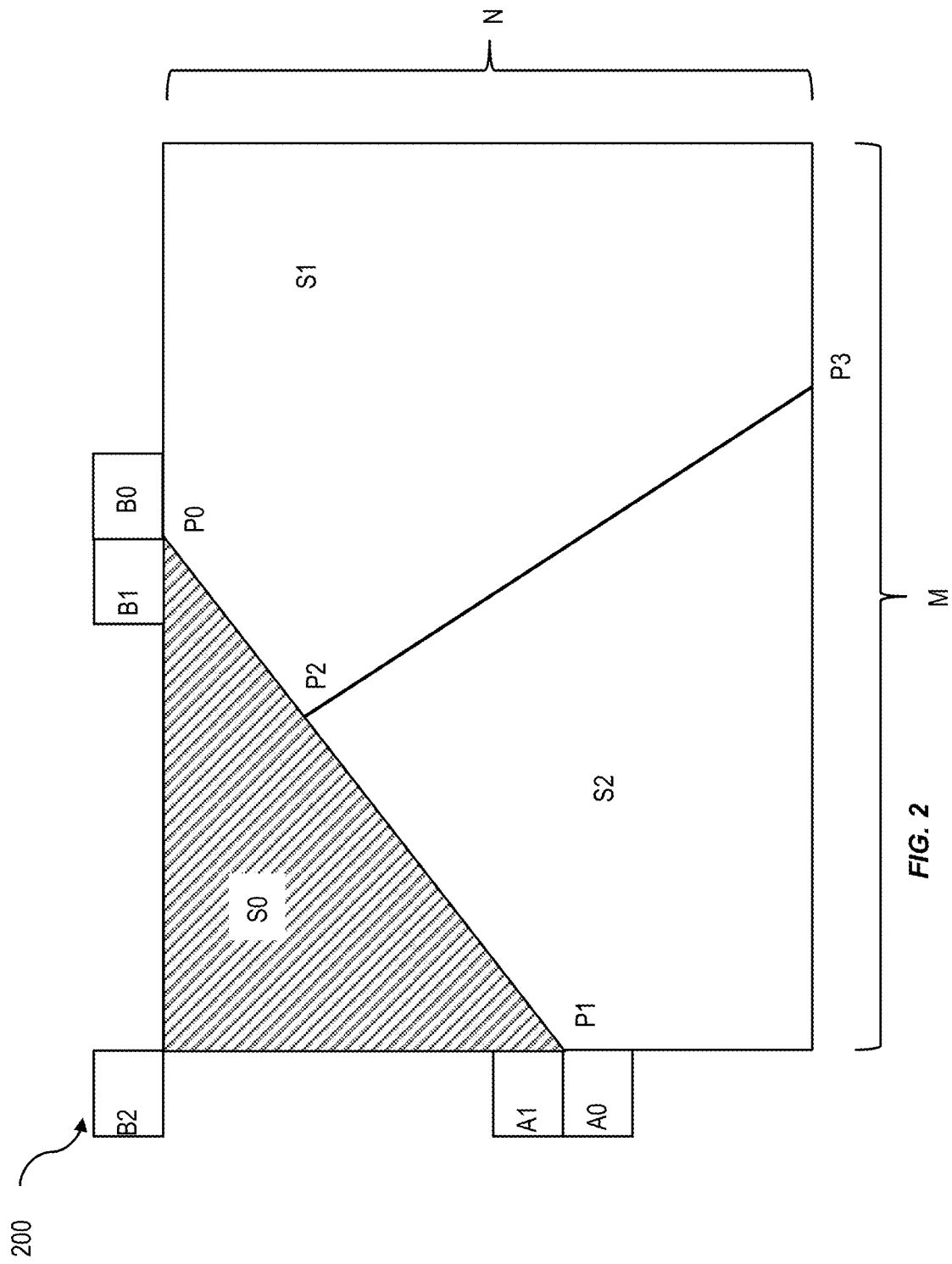
FIG. 2 is a diagram illustrating example positions of potential spatial motion vector candidates with respect to a first region (region S0) of an example current block partitioned according to geometric partitioning.

FIG. 2 is a diagram illustrating non-limiting examples of positions of potential spatial motion vector candidates with respect to a first region (region S0) of an example current block 200 partitioned according to geometric partitioning. Potential spatial motion vector candidates may be considered for constructing a motion vector candidate list during AMVP mode or merge mode. Current block 200 may be partitioned into three regions S0, S1, and S2, by straight lines between points P0, P1 and between points P2, P3, respectively. Each of region S0, region S1, and region S2 may be uni or bi-directionally predicted. Spatial candidates for first region (region S0), for instance as illustrated in FIG. 2 may include a lower-left candidate A0, a left candidate A1, an upper-left candidate B2, an upper candidate B1 and an upper-right candidate B0.

Figure 3:
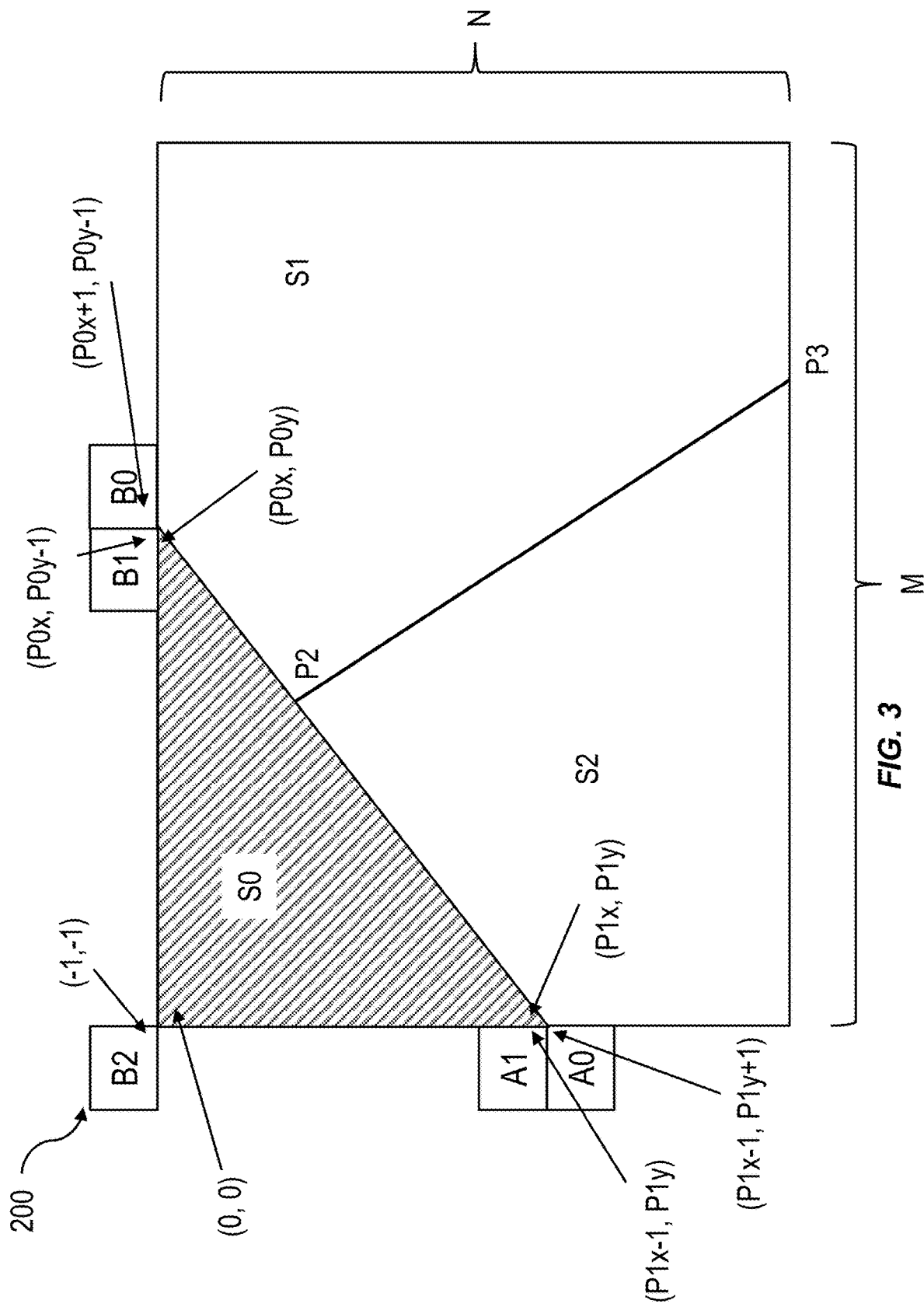
FIG. 3 illustrates FIG. 2 with annotation showing luma locations including the upper-left most luma location of the first region S0.

Still referring to FIG. 2, as illustrated and in some implementations, each location (A0, A1, B2, B1, and B0) may represent a block at the respective location. For example, an upper-left candidate B2 may be a block that resides at a location that is immediately to the left and immediately above region S0; for example, if the upper-left corner luma location of S0 is (0, 0), then the upper left candidate B2 may reside at location (−1,−1). A lower-left candidate A0 may be located immediately to the left and below of P1; or example, if P1's luma location is (P1x, P1y), the lower-left candidate A0 may reside at location (P1x−1, P1y+1). Left candidate A1 may be located immediately to the left of P1; for example, the left candidate A1 may reside at location (P1x−1, P1y). An upper candidate B1 may be located immediately above P0; for example, if P0's luma location is (P0x, P0y), the above candidate B1 may be located at (P0x, P0y−1). An above-right candidate B0 may be located immediately above and to the right of P0; for example, the above-right candidate B0 may reside at location (P0x+1, P0y−1). Other locations are possible, as will be apparent to persons skilled in the art, upon reviewing the entirety of this disclosure. FIG. 3 illustrates FIG. 2 with annotation showing luma locations including upper-left most luma location of a first region S0.

In some implementations, and still referring to FIG. 3, when constructing a candidate list for region S0, some potential candidates may be automatically marked as unavailable and removed from the candidate list because, where there is geometric partitioning, such partitioning may be performed to partition regions (or objects) within a frame that have different motion information. Accordingly, it may be inferred that blocks associated with those candidates likely represent another object with different motion and therefore these candidates may be automatically marked as unavailable (e.g., not further considered, removed from candidate list, and the like). In the example illustrated in reference to FIG. 2 above, for region S0, a lower-left candidate A0 may be automatically marked as unavailable because it may be likely that region S0 does not share motion information with a block located at the lower-left candidate A0. Similarly, for region S0, an upper-right candidate B0 may be automatically marked as unavailable because it is likely that region S0 does not share motion information with a block located at the upper-right candidate B0. In some implementations, it may be determined whether a lower-left candidate A0 and/or an upper-right candidate B0 likely share motion information or not by assessing line segment P0P1 (or points P0, P1), for example, by determining a slope of the line segment P0P1, extending the line segment into the lower-left candidate A0 block and/or upper-right candidate B0 block, and determining whether the lower-left candidate A0 and/or upper-right candidate B0 resides on a same side of the extended line segment as the first region S0.

Figure 4:
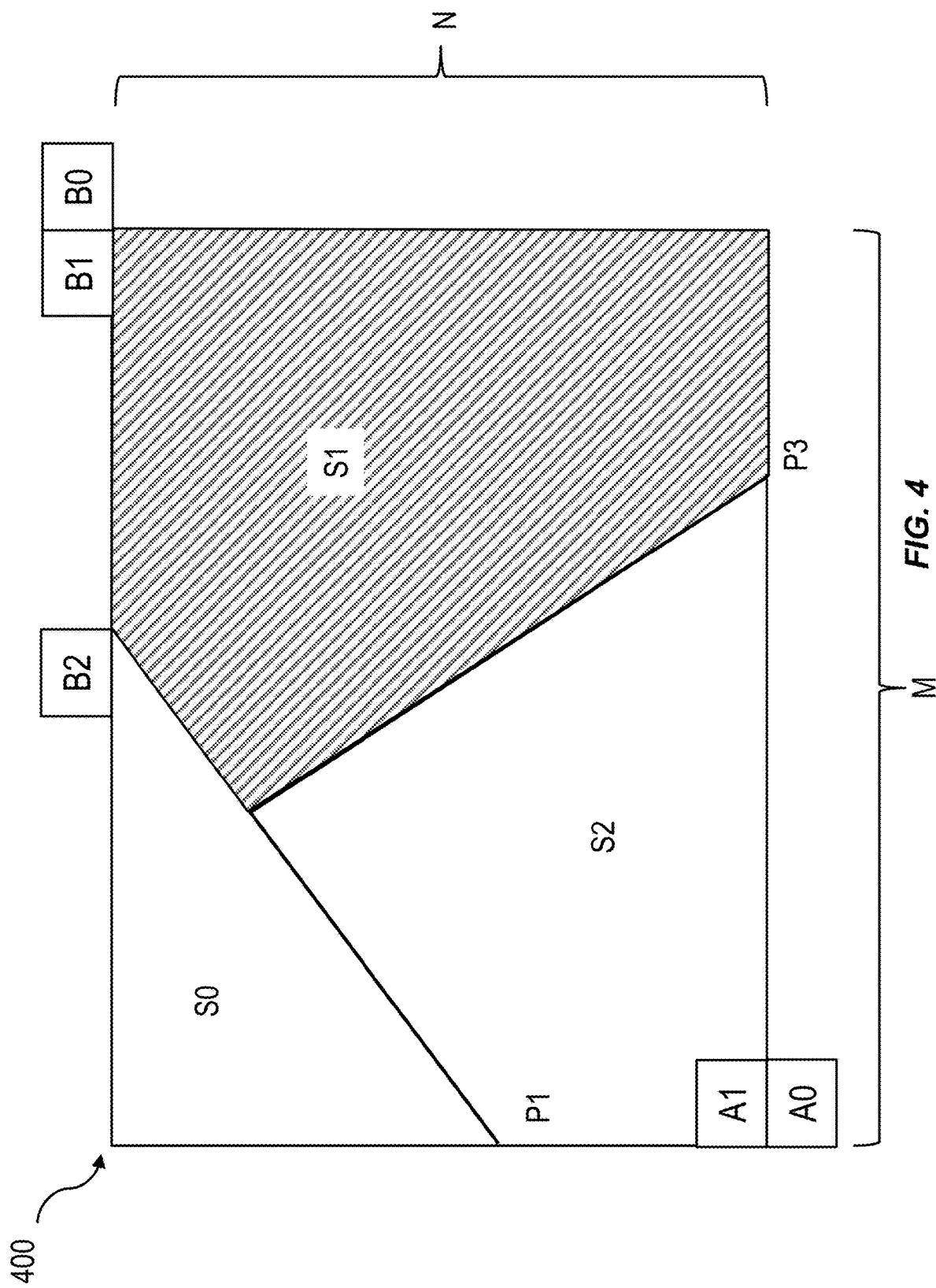
FIG. 4 is a diagram illustrating example positions of potential motion vector candidates with respect to a second region S1 of an example current block partitioned according to geometric partitioning.

FIG. 4 is a diagram illustrating non-limiting example positions of potential spatial motion vector candidates with respect to a second region (region S1) of an example current block 400 partitioned according to geometric partitioning. Potential spatial motion vector candidates may be considered for constructing a motion vector candidate list during AMVP mode or merge mode. Current block 400 may have been partitioned into three regions S0, S1, and S2, by straight lines between points P0, P1 and between points P2, P3, respectively. Each of region S0, region S1, and region S2 may be uni or bi-directionally predicted. Non-limiting examples of spatial candidates for second region (region S1) are illustrated in FIG. 4 and include a lower-left candidate A0, a left candidate A1, an upper— left candidate B2, an upper candidate B1 and an upper-right candidate B0.

Figure 5:
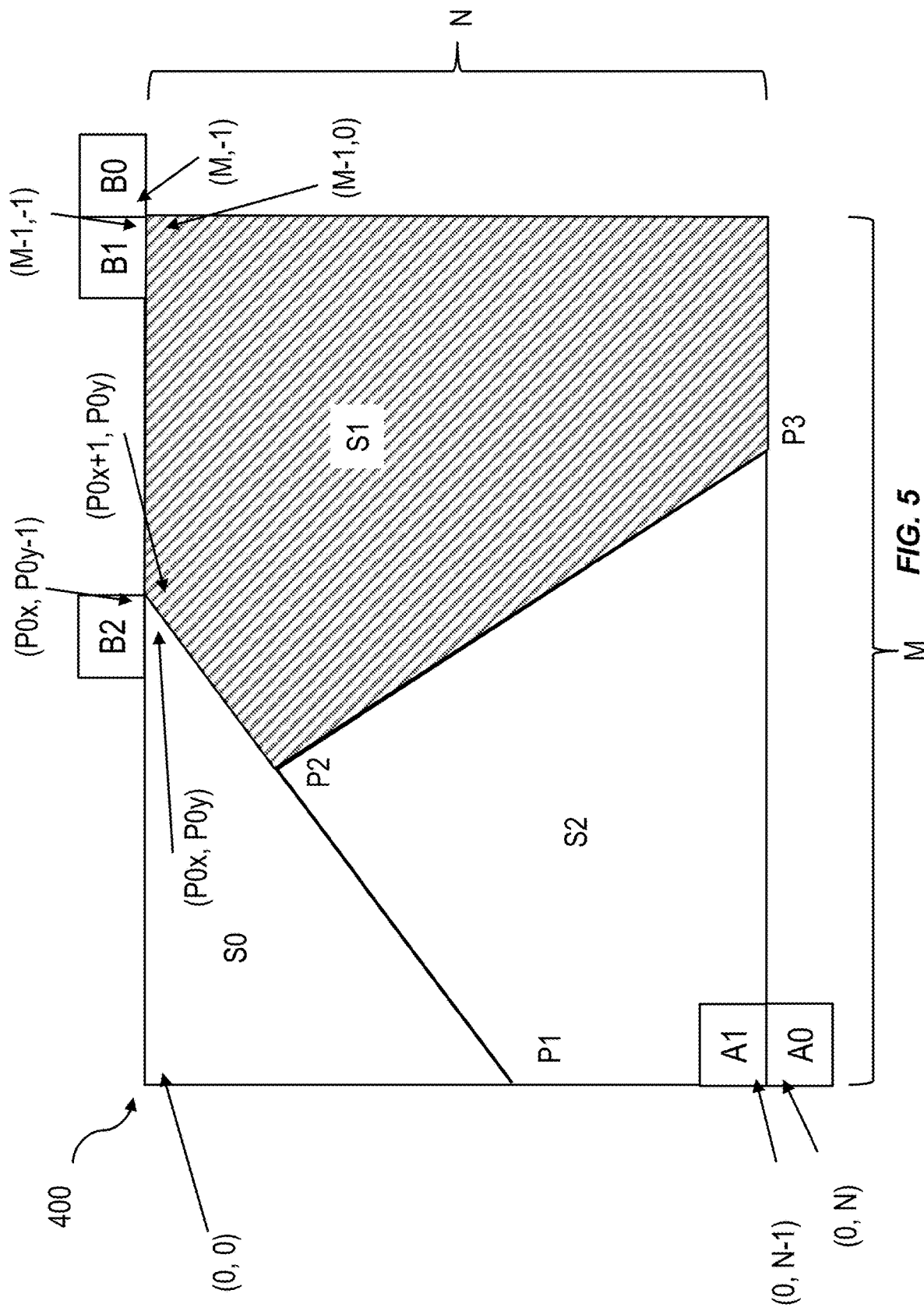
FIG. 5 illustrates FIG. 4 with annotation showing luma locations including the lower-left most luma location of the third region S2 and the upper-right most luma location of the second region S1.

As illustrated, and still referring to FIG. 4, each location (A0, A1, B2, B1, and B0) may represents a block at the respective location. For example, an upper-left candidate B2 may be a block that resides at a luma location that is immediately to the left and immediately above an upper— left most location of region S1; for example, if the upper-left corner luma location of S1 is adjacent P0 with luma location coordinates (P0x+1, P0y), then the upper left candidate B2 may reside at location (P0x, P0y−1). A lower-left candidate A0 is located immediately below the lower-left most location of the third region (region S2); for example, if a lower-left most location of the third region (region S2) is located at (0, N−1), then the lower-left candidate A0 may reside at location (0, N). A left candidate A1 may be located immediately to the left of a lower-left most location of third region (region S2); for example, the left candidate A1 may reside at location (0, N−1). An upper candidate B1 may be located immediately above an upper-right most location of region S 1; for example, if the upper-right most location of region S1 is located at (M−1, 0), then B1 may reside at location (M−1,−1). An upper-right candidate B0 may be located immediately above and to the right of an upper-right most location of region S1; for example, the upper-right candidate B0 may reside at location (M, −1). FIG. 5 illustrates FIG. 4 with annotation showing luma locations including an lower-left most luma location of a third region S2 and an upper-right most luma location of a second region S1.

In some implementations, and still referring to FIG. 5, when constructing a candidate list for region S1, some potential candidates may be automatically marked as unavailable and removed from the candidate list because, where there is geometric partitioning, such partitioning may be performed to partition regions (or objects) within a frame that have different motion information. Accordingly, it may be inferred that blocks associated with those candidates likely represent another object with different motion and therefore these candidates may be automatically marked as unavailable (e.g., not further considered, removed from candidate list, and the like). In a non-limiting example illustrated above in reference to FIG. 4, for region S1, an upper— left candidate B2 may be automatically marked as unavailable because it may be likely that region S1 does not share motion information with a block located at the above-left candidate B2. Similarly, in some implementations, for region S1, a left candidate A1 may be automatically marked as unavailable because it may be likely that region S1 does not share motion information with a block located at the left-candidate A1, which may be third region S2. Similarly, in some implementations, for region S1, a below-left candidate A0 may be automatically marked as unavailable because it is likely that region S1 does not share motion information with a block located at the lower-left candidate A0, which may be below third region S2.

Figure 6:
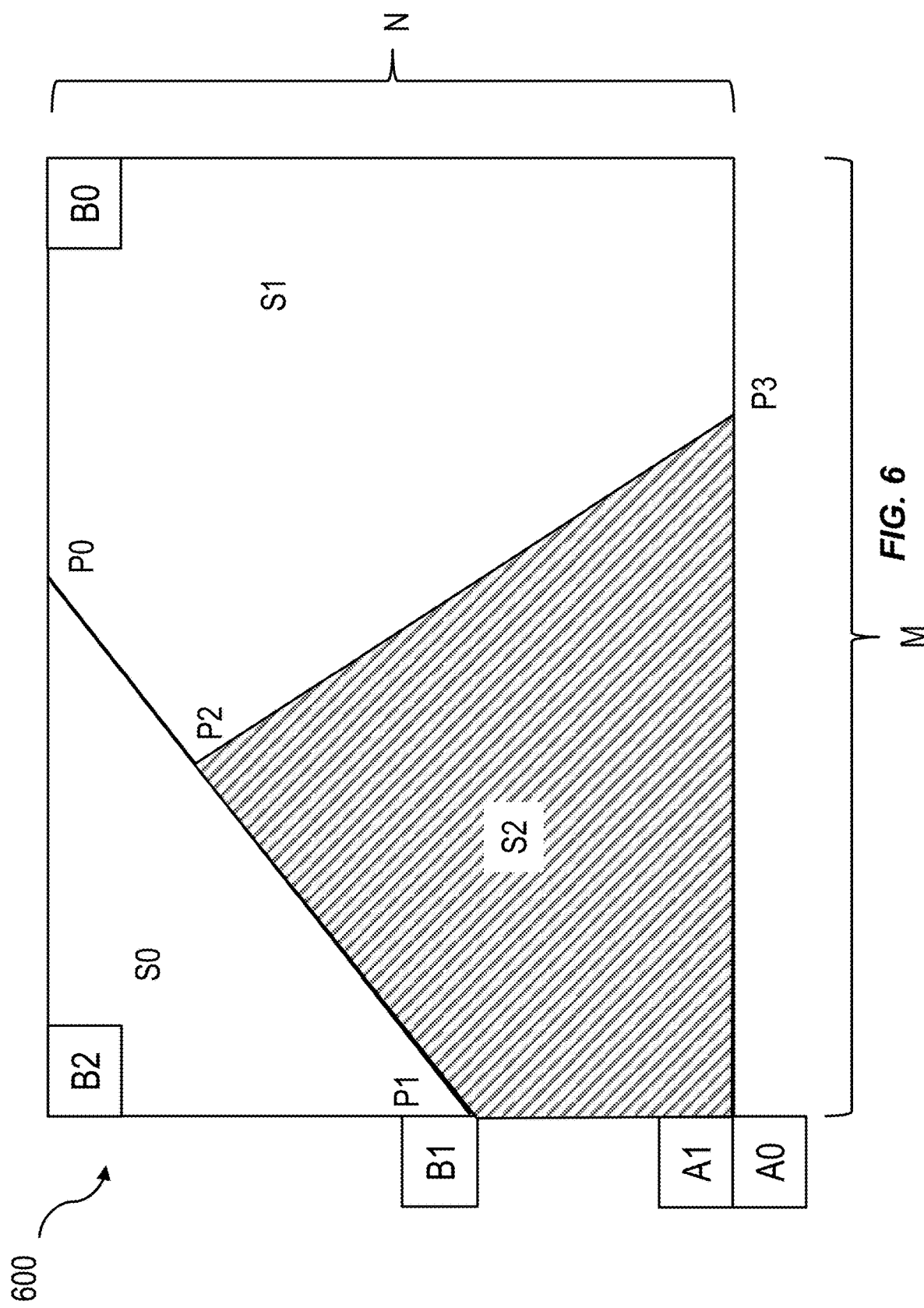
FIG. 6 is a diagram illustrating example positions of potential spatial motion vector candidates with respect to a third region (region S2) of an example current block partitioned according to geometric partitioning.

FIG. 6 is a diagram illustrating example positions of potential spatial motion vector candidates with respect to a third region (region S2) of an example current block 600 partitioned according to geometric partitioning. Potential spatial motion vector candidates may be considered for constructing a motion vector candidate list during AMVP mode or merge mode. Current block 600 may be partitioned into three regions S0, S1, and S2, by straight lines between points P0, P1 and between points P2, P3, respectively. Each of region S0, region S1, and region S2 may be uni or bi-directionally predicted. Non-limiting examples of spatial candidates for third region (region S2) are illustrated in FIG. 6 and may include a lower-left candidate A0, a left candidate A1, an upper-left candidate B2, an upper candidate B1 and an upper-right candidate B0.

Figure 7:
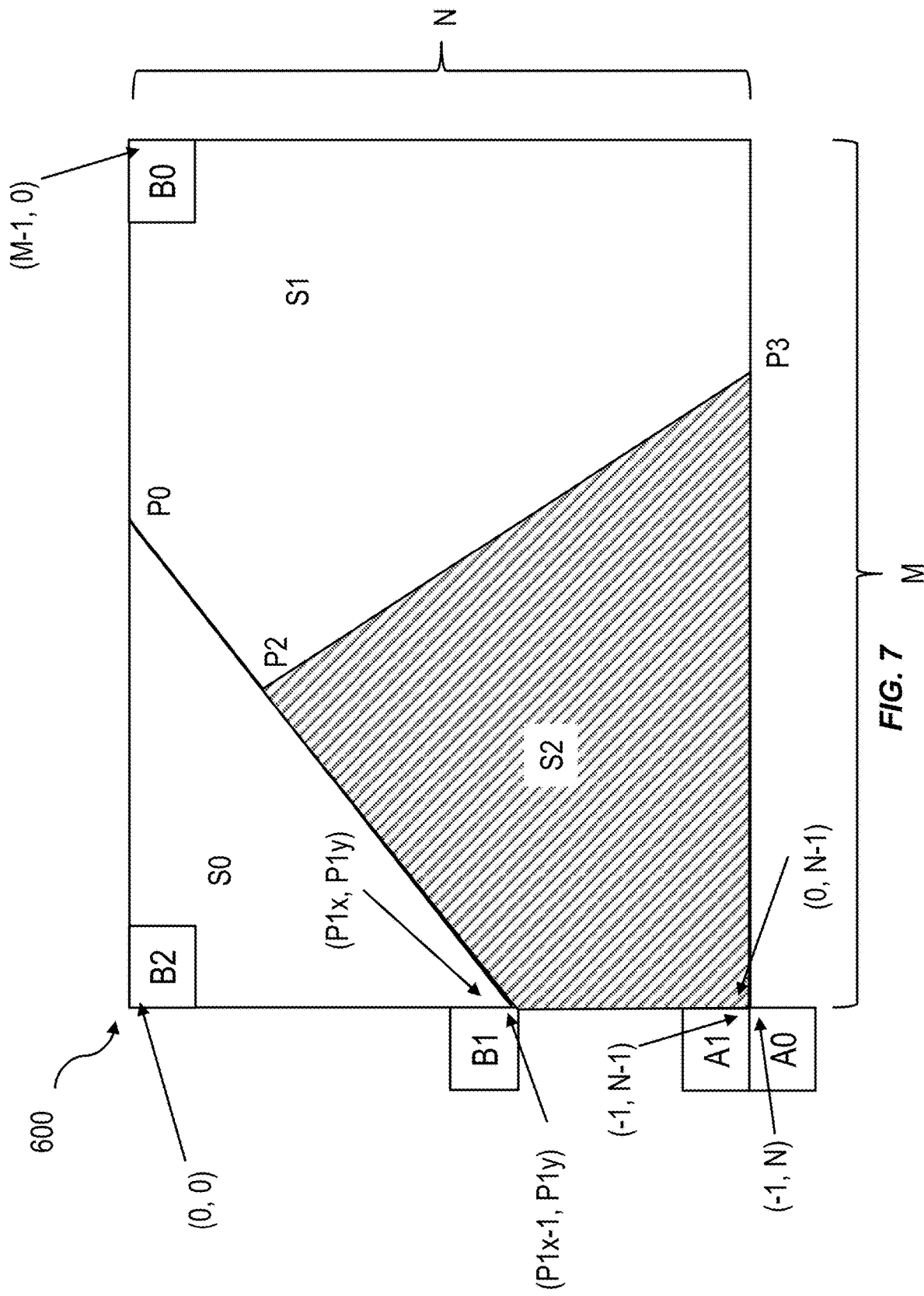
FIG. 7 illustrates FIG. 6 with annotation showing luma locations including the lower-left most luma location of the third region S2 and the upper-right most luma location of the second region S1.

As illustrated, and still referring to FIG. 6, each location (A0, A1, B2, B1, and B0) may represent a block at the respective location. For example, an upper-left candidate may be a block that resides at a luma location that is above and to the left of region S2; for example, the upper-left candidate B2 may be the first region S0. If S0 is located at (0,0), then upper-left candidate B2 may be located at (0,0). A lower-left candidate A0 may be located immediately to the left and immediately below a lower-left most location of region S2; for example, if the lower-left most location of region S2 is located at (0, N−1), then the lower-left candidate A0 may reside at (−1, N). A left candidate A1 may be located immediately to the left of a lower-left most location of region S2; for example, the left candidate A1 may reside at (−1, N−1). An upper candidate B1 may be located above and to the left of region S2, which may be adjacent point P1; for example, if P1 is located at (P1x, P1y), then the upper candidate B1 may be located at (P1x−1, P1y). An upper-right candidate B0 may be a block that resides at a luma location that is above and to the right of region S2; for example, the upper-right candidate B0 may be the second region S1. For example, an upper-right candidate may be located at an upper-right most location of S1, which may reside at (M−1, 0). FIG. 7 illustrates FIG. 6 with annotation showing luma locations including a lower-left most luma location of a third region S2 and an upper-right most luma location of a second region S1.

In some implementations, and still referring to FIG. 7, when constructing a candidate list for region S2, some potential candidates may be automatically marked as unavailable and removed from the candidate list because, where there is geometric partitioning, such partitioning may be performed to partition regions (or objects) within a frame that have different motion information. Accordingly, it may be inferred that blocks associated with those candidates likely represent another object with different motion and therefore these candidates may be automatically marked as unavailable (e.g., not further considered, removed from candidate list, and the like). In a non-limiting example provided above in FIG. 6, for region S2, an upper— left candidate B2 may be automatically marked as unavailable because it is likely that region S2 does not share motion information with a block located at the above-left candidate B2 (e.g., S0). Similarly, in some implementations, for region S2, an upper— right candidate A0 may be automatically marked as unavailable because it is likely that region S2 does not share motion information with a block located at the left-candidate B0, which may be second region S1. Similarly, in some implementations, for region S2, an above candidate B1 may be automatically marked as unavailable because it is likely that region S2 does not share motion information with a block located at the upper candidate B1, which is to the left of first region S0.

Figure 8:
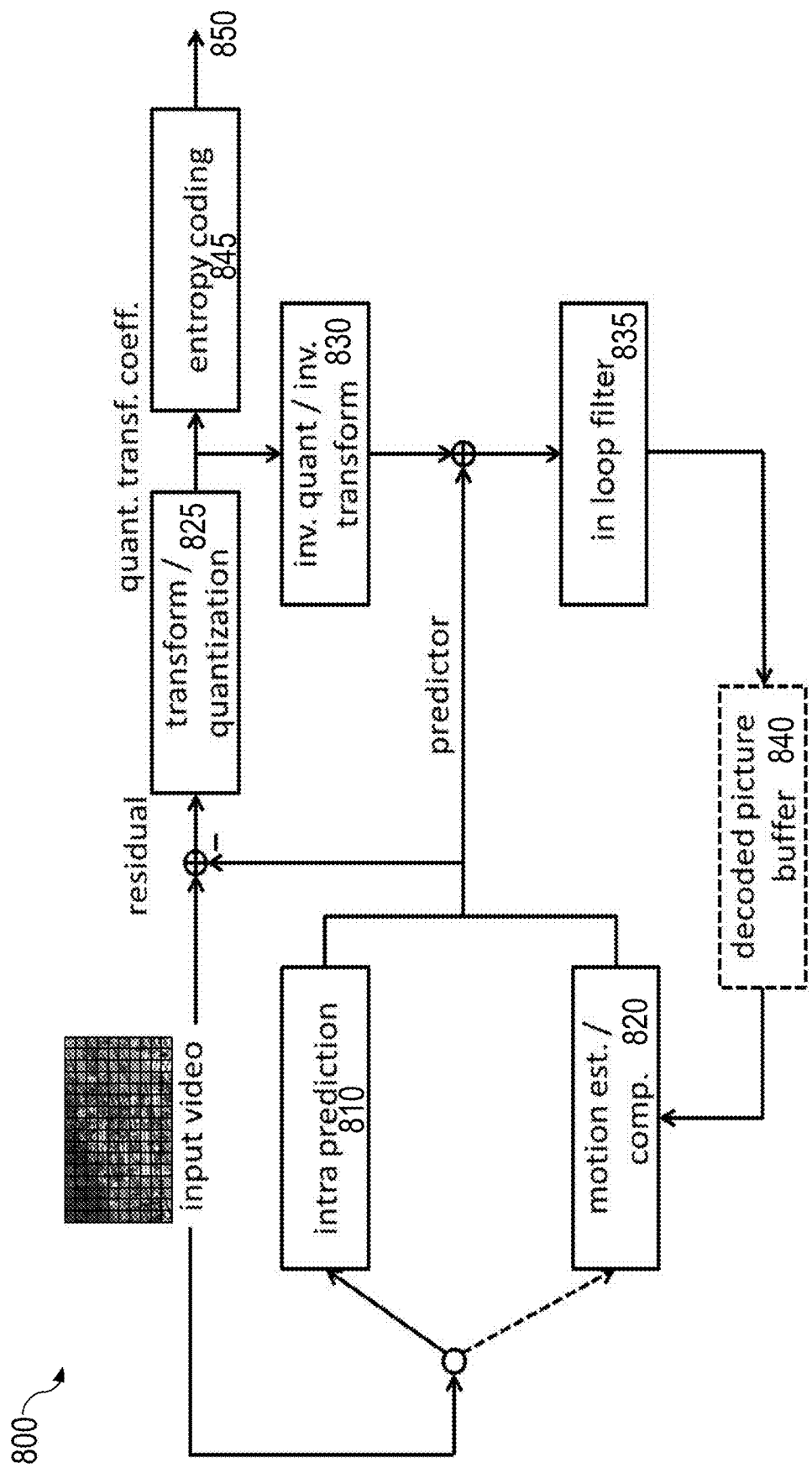
FIG. 8 is a system block diagram illustrating an example video encoder capable encoding a video using inter prediction with geometric partitioning with an adaptive number of regions.

FIG. 8 is a system block diagram illustrating an example video encoder 800 capable encoding a video using inter prediction with geometric partitioning with an adaptive number of regions. Example video encoder 800 receives an input video 805, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this partitioning may include a group of sub-blocks that can be called predictive units (PU). Transform units (TU) may also be utilized. Such a partitioning scheme may include performing geometric partitioning with an adaptive number of regions according to some aspects of the current subject matter.

Still referring to FIG. 8, example video encoder 800 may include an intra prediction processor 815, a motion estimation/compensation processor 820 (also referred to as an inter prediction processor) capable of supporting geometric partitioning with an adaptive number of regions including AMVP mode and merge mode, a transform/quantization processor 825, an inverse quantization/inverse transform processor 830, an in-loop filter 835, a decoded picture buffer 840, and an entropy coding processor 845. In some implementations, motion estimation/compensation processor 820 may perform geometric partitioning with an adaptive number of regions including use of AMVP mode and merge mode. Bitstream parameters that signal geometric partitioning modes, AMVP mode, and merge mode may be input to the entropy coding processor 845 for inclusion in an output bitstream 850.

In operation, and still referring to FIG. 8, for each block of a frame of input video 805, whether to process the block via intra picture prediction or using motion estimation/compensation may be determined. A block may be provided to intra prediction processor 810 or motion estimation/compensation processor 820. If block is to be processed via intra prediction, intra prediction processor 810 may perform processing to output predictor. If block is to be processed via motion estimation/compensation, motion estimation/compensation processor 820 may perform the processing including use of geometric partitioning with AMVP mode and merge mode to output the predictor.

With continued reference to FIG. 8, a residual may be formed by subtracting predictor from input video. Residual may be received by transform/quantization processor 825, which may perform transformation processing (e.g., discrete cosine transform (DCT)) to produce coefficients, which may be quantized. Quantized coefficients and any associated signaling information may be provided to entropy coding processor 845 for entropy encoding and inclusion in output bitstream 850. Entropy encoding processor 845 may support encoding of signaling information related to geometric partitioning modes, AMVP mode, and merge mode. In addition, quantized coefficients may be provided to inverse quantization/inverse transformation processor 830, which may reproduce pixels, which may be combined with predictor and processed by in loop filter 835, an output of which may be stored in decoded picture buffer 840 for use by motion estimation/compensation processor 820 that is capable of supporting geometric partitioning modes, AMVP mode, and merge mode.

Figure 9:
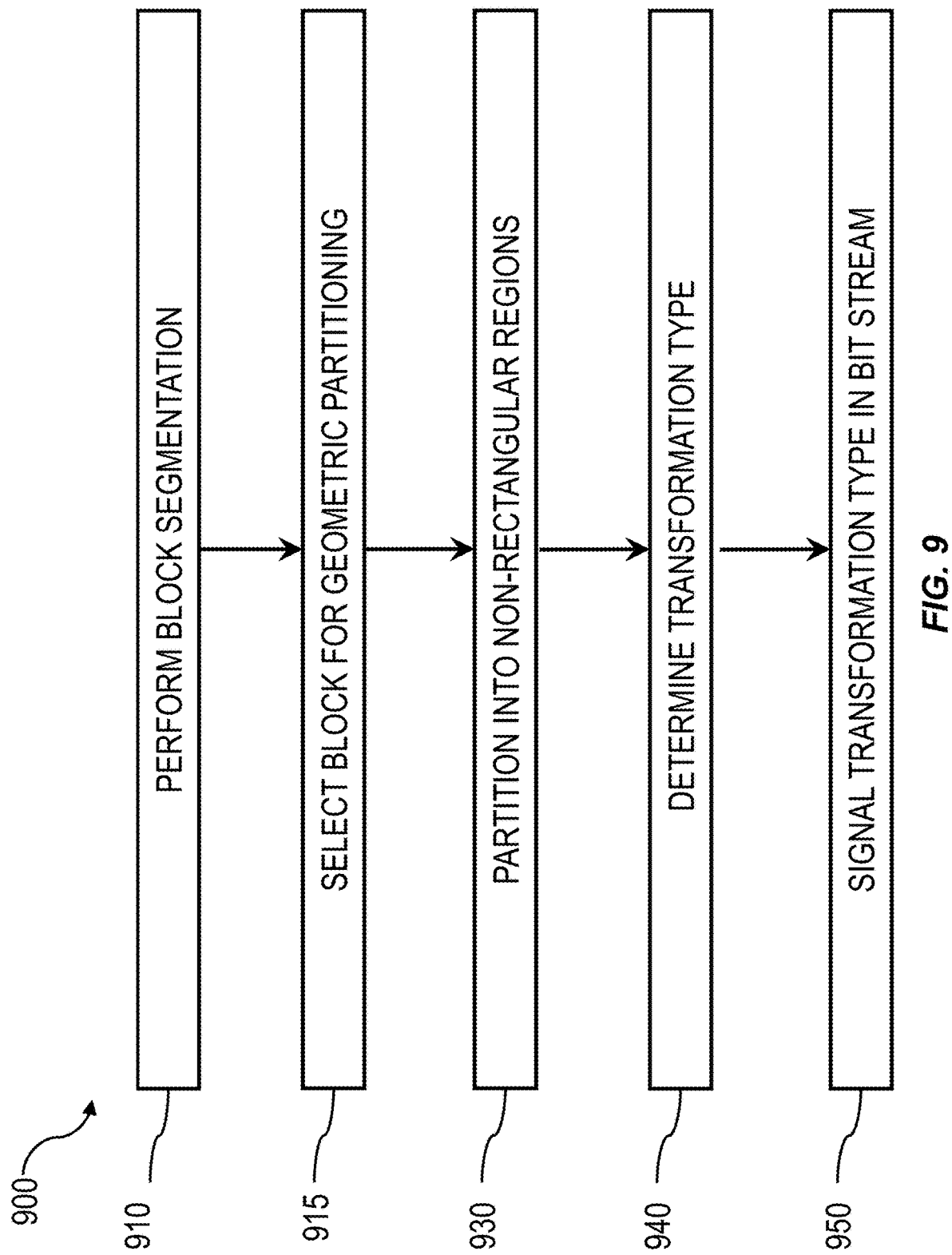
FIG. 9 is a process flow diagram illustrating an example process of encoding a video with geometric partitioning with an adaptive number of regions and inter prediction according to some aspects of the current subject matter that can reduce encoding complexity while increasing compression efficiency.

FIG. 9 is a process flow diagram illustrating an example process 300 of encoding a video with geometric partitioning an inter prediction according to some aspects of the current subject matter that may reduce encoding complexity while increasing compression efficiency. At step 910, a video frame may undergo initial block segmentation, for example, using a tree-structured macro block partitioning scheme that may include partitioning a picture frame into CTUs and CUs. At 920, a block may be selected for geometric partitioning with an adaptive number of regions. Selection may include identifying according to a metric rule that block is to be processed according to a geometric partitioning mode.

At step 930, and still referring to FIG. 9, a geometric partition with three or more regions may be determined. At least two line segments may be determined that will separate pixels contained within the block according to their inter frame motion into three or more regions (e.g., region 0, region 1, and region 2) such that pixels (e.g., luma samples) within each of the respective regions have similar motion, which may be different than the motion of pixels within other regions (e.g., region 1).

At step 940, and with continued reference to FIG. 9, motion information of each region may be determined and processed using AMVP mode or merge mode. When processing a region using AMVP mode, a candidate list may be constructed by considering both spatial and temporal candidates, which may include spatial candidates described above, and which may include marking some candidates as unavailable. A motion vector may be selected from a list of motion vector candidates as a motion vector prediction and a motion vector difference (e.g., residual) may be computed. An index into candidate list may be determined. In merge mode, a candidate list may be constructed by considering both spatial and temporal candidates, which may include spatial candidates as described above, and which may include marking some candidates as unavailable. A motion vector may be selected from a list of motion vector candidates for a region to adopt motion information of another block. An index into candidate list may be determined.

At step 950, and still referring to FIG. 9, a determined geometric partition and motion information may be signaled in a bitstream. Signaling geometric partitions in bitstream may include, for example, including locations of P0, P1, P2, P3; an index into one or more predetermined templates; and the like. Signaling of motion information when processing a region using AMVP may include including the motion vector difference (e.g., residual) and index into a motion vector candidate list in bitstream. Signaling motion information when processing a region using merge mode may include including an index into a motion vector candidate list in bitstream.

Figure 10:
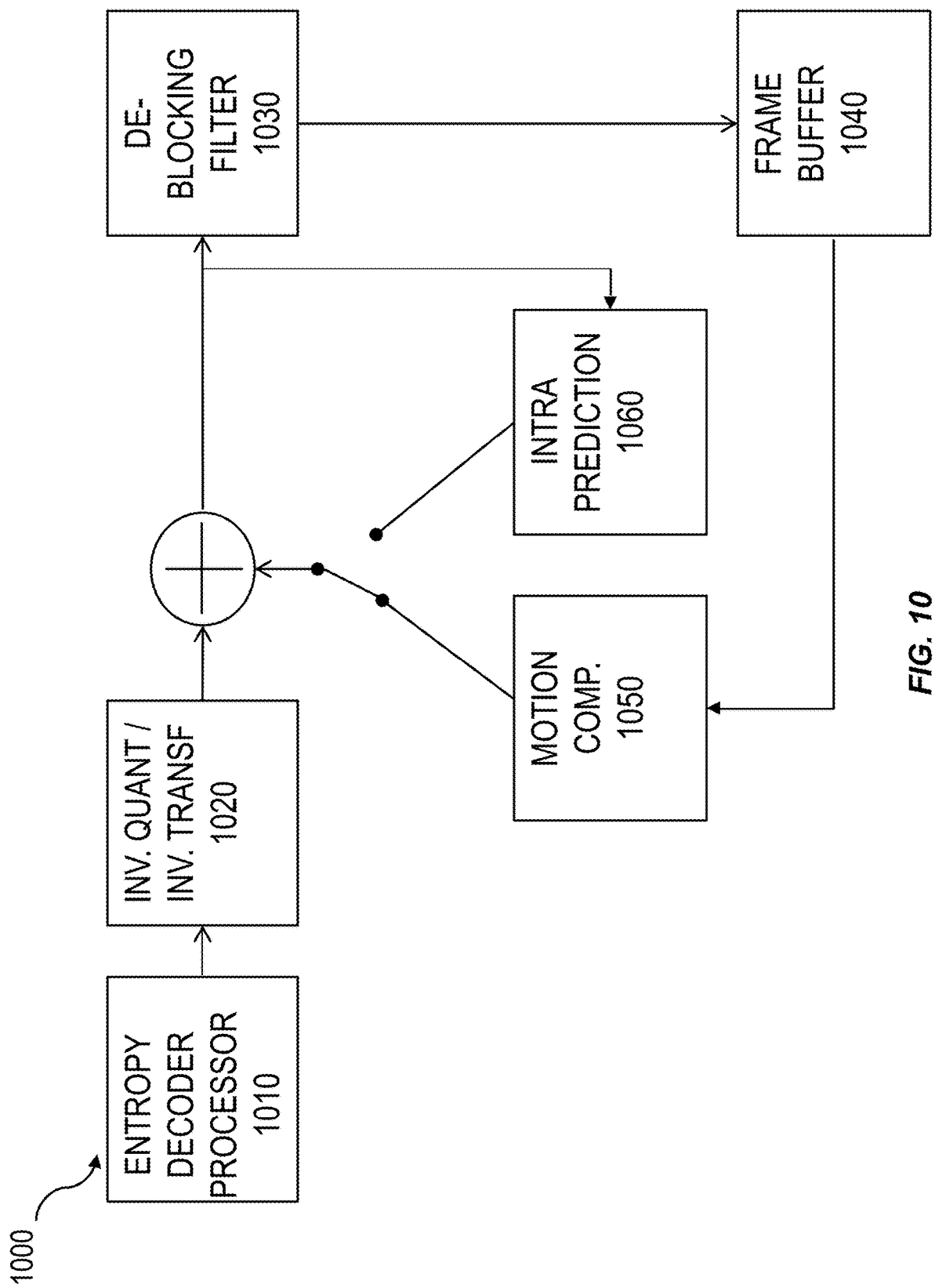
FIG. 10 is a system block diagram illustrating an example decoder capable of decoding a bitstream using inter prediction and geometric partitioning with an adaptive number of regions, which can improve complexity and processing performance for video encoding and decoding.

FIG. 10 is a system block diagram illustrating an example decoder 1000 capable of decoding a bitstream 1070 using inter prediction and geometric partitioning with an adaptive number of regions, which may improve complexity and processing performance for video encoding and decoding. Decoder 1000 may include an entropy decoder processor 1010, an inverse quantization and inverse transformation processor 1020, a deblocking filter 1030, a frame buffer 1040, motion compensation processor 1050 and intra prediction processor 1060. In some implementations, bitstream 1070 may include parameters that signal a geometric partitioning mode, AMVP mode, and/or merge mode. Motion compensation processor 1050 may reconstruct pixel information using geometric partitioning as described herein.

In operation, and still referring to FIG. 10, bitstream 1070 may be received by decoder 1000 and input to entropy decoder processor 1010, which may entropy decode bitstream into quantized coefficients. Quantized coefficients may be provided to inverse quantization and inverse transformation processor 1020, which may perform inverse quantization and inverse transformation to create a residual signal. Residual signal may be added to the output of motion compensation processor 1050 or intra prediction processor 1060 according to processing mode. An output of motion compensation processor 1050 and intra prediction processor 1060 may include a block prediction based on a previously decoded block. A sum of prediction and residual may be processed by deblocking filter 1030 and stored in a frame buffer 1040. For a given block, (e.g., CU or PU), when bitstream 1070 signals that partitioning mode is geometric partitioning, motion compensation processor 1050 may construct prediction based on geometric partition approach described herein.

Figure 11:
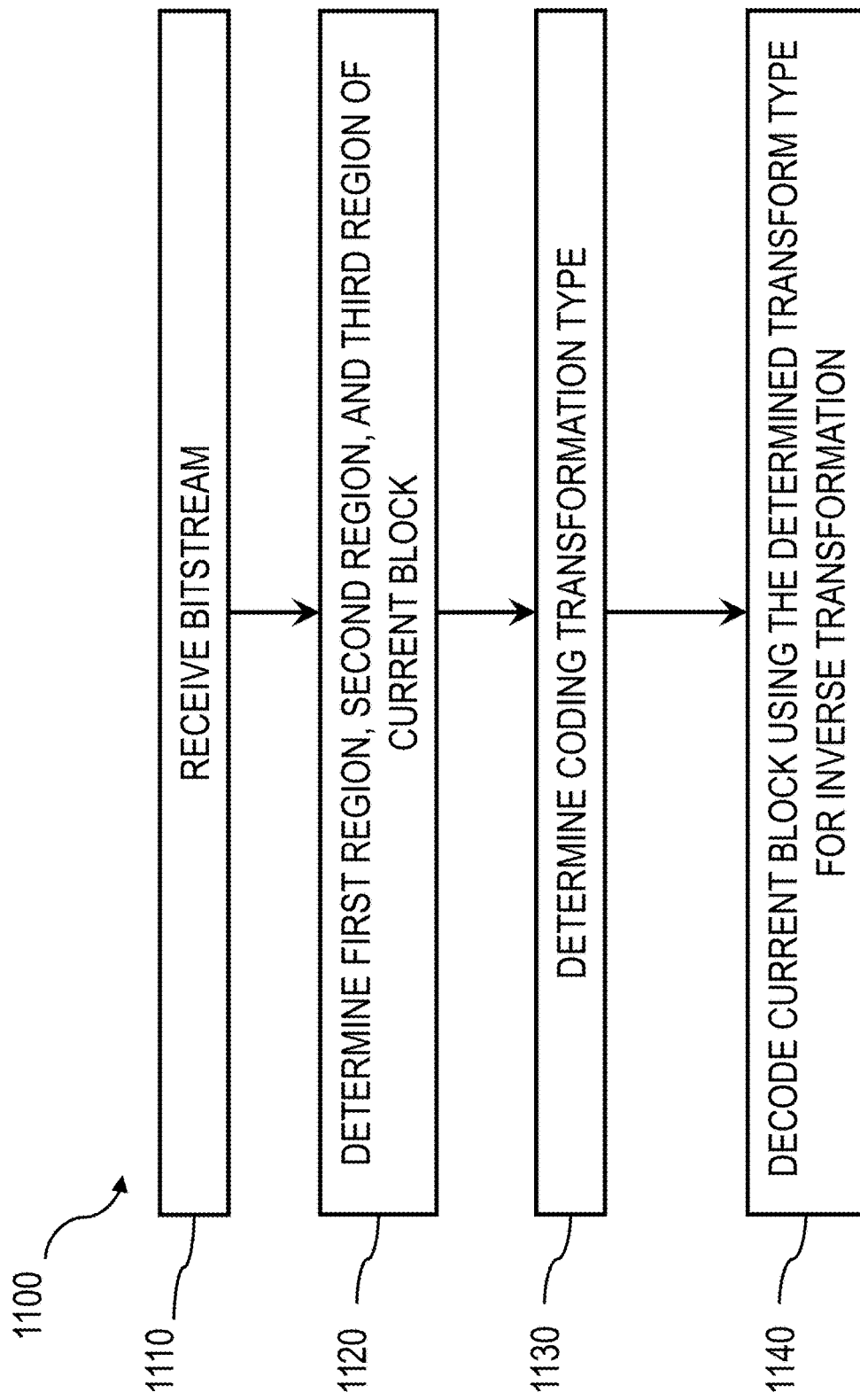
FIG. 11 is a process flow diagram illustrating an example process of decoding a bitstream using inter prediction in geometric partitioning with an adaptive number of regions, which can improve complexity and processing performance for video encoding and decoding.

FIG. 11 is a process flow diagram illustrating an example process 1100 of decoding a bitstream using inter prediction in geometric partitioning with an adaptive number of regions, which may improve complexity and processing performance for video encoding and decoding. At step 1110, a bitstream is received, which may include a current block (e.g., CTU, CU, PU). Receiving may include extracting and/or parsing the current block and associated signaling information from bitstream. Decoder may extract or determine one or more parameters that characterize geometric partitioning. These parameters may include, for example, indices of a start and end of a line segment (e.g., P0, P1, P2, P3). Extraction or determining may include identifying and retrieving parameters from bitstream (e.g., parsing the bitstream).

At step 1120, and still referring to FIG. 11, decoder partitions a current block via a geometric partitioning mode into three portions of current block, such as without limitation a first region, a second region, and a third region of the current block as described above, may be determined and according to a geometric partitioning mode. Partitioning current block into three portions may include partitioning current block into a first region and a second region and partitioning the second region into two sub-regions. Current block may include a coding tree unit. Determining may include determining whether geometric partitioning mode is enabled (e.g., true) for current block. If geometric partitioning mode is not enabled (e.g., false), decoder may process block using an alternative partitioning mode. If geometric partitioning mode is enabled (e.g., true), three or more regions may be determined and/or processed.

At step 1130, and still referring to FIG. 11, a motion vector associated with a portion of first portion, second portion, and third portion may be determined. Determining the motion vector may include determining whether motion information of portion is to be determined using AMVP mode, merge mode, or the like. For instance, determining may include determining that a merge mode is enabled for a first portion of the three portions; first portion may be decoded according to the merge mode. As a further non-limiting example, determining may include determining that a merge mode is disabled for a first portion of the three portions; first portion may be decoded as a function of a motion vector difference, for instance using AMVP mode. When processing a portion using AMVP mode, a candidate list may be constructed by considering both spatial and temporal candidates, which may include spatial candidates described above, and which may include marking some candidates as unavailable. A motion vector may be selected from a list of motion vector candidates as a motion vector prediction; a motion vector difference (e.g., residual) may be computed. In merge mode, determining may include constructing a candidate list of spatial candidates and temporal candidates for each portion. Constructing a candidate list may include automatically marking candidates as unavailable and removing unavailable candidates from the candidate list. An index into constructed candidate list may be parsed from bitstream and used to select a final candidate from the candidate list. Motion information for a current portion can be determined to be the same as motion information of a final candidate (e.g., the motion vector for the portion can be adopted from the final candidate).

Still referring to FIG. 11, at step 1140, a current block may be decoded using a determined motion vector.

Although a few variations have been described in detail above, other modifications or additions are possible. For example, geometric partitioning may be signaled in a bitstream based on rate-distortion decisions in an encoder. Coding may be based on a combination of regular predefined partitions (e.g., templates), temporal and spatial prediction of the partitioning, and/or additional offsets. Each geometrically partitioned region may utilize motion compensated prediction or intra-prediction. A boundary of predicted regions may be smoothed before a residual is added.

In some implementations, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at Coding Unit level, a joint-classifier decision tree structure may eliminate unnecessary iterations and control the risk of false prediction. In some implementations, geometric partitioning with an adaptive number of regions may be available as an additional partitioning option available at every leaf node of QTBT.

In some implementations, a decoder may include a partition processor that generates a geometric partition for a current block and provides all partition-related information for dependent processes. Partition processor may directly influence motion compensation as it may be performed segment-wise in case a block is geometrically partitioned. Further, partition processor may provide shape information to an intra-prediction processor and transform coding processor.

In some implementations, additional syntax elements may be signaled at different hierarchy levels of a bitstream. For enabling geometric partitioning with an adaptive number of regions for an entire sequence, an enable flag may be coded in a Sequence Parameter Set (SPS). Further, a CTU flag can be coded at the coding tree unit (CTU) level to indicate whether any coding units (CU) use geometric partitioning with an adaptive number of regions. A CU flag can be coded to indicate whether the current coding unit utilizes geometric partitioning with an adaptive number of regions. The parameters which specify the line segment on the block may be coded. For each region, a flag may be decoded, which may specify whether current region is inter- or intra-predicted.

In some implementations, a minimum region size can be specified.

The subject matter described herein provides many technical advantages. For example, some implementations of the current subject matter can provide for partitioning of blocks that reduces complexity while increasing compression efficiency. In some implementations, blocking artifacts at object boundaries can be reduced.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
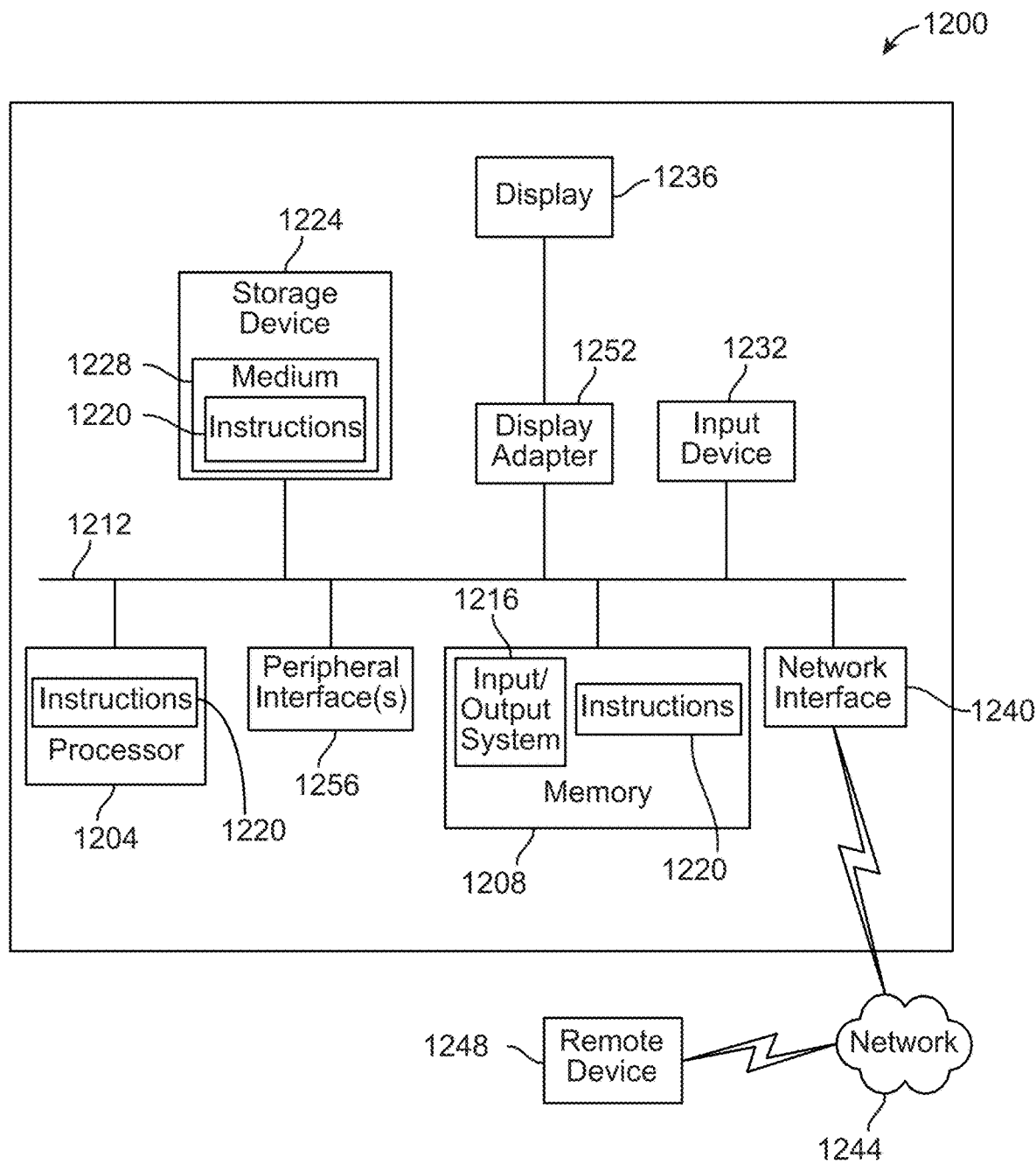
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An encoder comprising circuitry configured to encode a bitstream for decoding by a compatible decoder, in which the decoder is configured to:
   receive the encoded bitstream including a current picture, the current picture further including a current block having at least a first partition boundary partitioning the block into first and second non-rectangular regions, and a second partition boundary, intersecting the at least first partition boundary, partitioning the second non-rectangular region to partition the current block into three portions;
   determine a first predictor for use within the first non-rectangular region using a first motion vector selected from a first list of motion vector candidates;
   determine a second predictor for use within the second non-rectangular region using a second motion vector selected from a second list of motion vector candidates; and
   decode the current block using the first predictor and the second predictor, wherein decoding further comprises smoothing the first predictor and the second predictor across the at least first partition boundary.

2. The encoder of claim 1 wherein the current block is a current coding tree unit.

3. The encoder of claim 1 wherein the first partition includes a first geometric partition.

4. The encoder of claim 1 wherein the second partition includes a second geometric partition.

5. An encoder comprising circuitry configured to encode a bitstream for decoding by a compatible decoder, in which the decoder is configured to:
   receive the encoded bitstream, wherein the bitstream includes a current picture, the current picture including a current block having a block size of N×N where N is equal to 64 or 128, and having at least a first geometric partition boundary partitioning the block into first and second non-rectangular regions, and a second geometric partition boundary, intersecting the at least first geometric partition boundary, partitioning the second non-rectangular region to partition the current block into three portions;
   determine a first predictor for use within the first non-rectangular region using a first motion vector selected from a first list of motion vector candidates;
   determine a second predictor for use within the second non-rectangular region using a second motion vector selected from a second list of motion vector candidates; and
   decode the current block using the first predictor and the second predictor, wherein decoding further comprises smoothing the first predictor and the second predictor across the at least first geometric partition boundary.

6. The encoder of claim 5 wherein the current block is a current coding tree unit.

\* \* \* \* \*